Dec. 10, 1963    G. F. DAVIES    3,113,429
STEERING AND SPEED CONTROL FOR JET PROPELLED VEHICLES
Filed Feb. 14, 1961

*INVENTOR.*
GAIL F. DAVIES
BY
*Eber J. Hyde*
ATTORNEY

United States Patent Office 3,113,429
Patented Dec. 10, 1963

3,113,429
STEERING AND SPEED CONTROL FOR JET PROPELLED VEHICLES
Gail F. Davies, Mentor, Ohio, assignor to Clevite Corporation, a corporation of Ohio
Filed Feb. 14, 1961, Ser. No. 89,258
14 Claims. (Cl. 60—35.54)

This invention relates to missiles and aerospace vehicles of the type employing a thrust reaction nozzle and more particularly the invention is concerned with the utilization of the effective throat area of the nozzle to provide speed and steering control for missile or jet propelled vehicles.

The employment of the invention is below described in connection with a missile, although it will be appreciated by those versed in the art that the invention finds application in rocket engines and space vehicles.

In the normal concept of missiles propelled by jet blast, either through combustion of solids or liquids, steering control is brought about through vanes located aft of the nozzle deflecting the nozzle stream, or through vernier rockets attached to the side of the missile which are fired to give rotation or directional shift. The use of either of these methods and other vectoring approaches applied in the past have necessitated considerable apparatus for steering and speed control. Such methods have been employed at the expense and sacrifice of range, by reason of the penalty resulting from excessive weight.

It is the primary object of this invention to control the speed and to enable steering of such missiles by selectively varying the effective throat area of the discharge nozzle.

It is a further object of this invention to provide a speed and/or vector thrust control apparatus operable within an environment of extreme temperatures such as are customarily encountered in a thrust discharge nozzle of a missile.

It is another object of this invention to utilize thermodegradation and/or transpiration cooling to achieve structural compatibility with extreme temperatures prevailing within the thrust nozzle to enable operability of speed and/or vector controls within the nozzle.

It is a further object of this invention to improve the aerodynamic characteristics of missiles by obviating the requirement for mounting directional control devices on external surfaces of the missiles.

It is another object of this invention to provide a missile adapted to incorporate a predetermined flight pattern, whereby means is established to enable evasive flight action against anti-missile missiles.

An aspect of the invention resides in the provision of a jet propelled vehicle which includes a convergent-divergent thrust nozzle with a throat of restricted cross sectional area. A jet deflecting arrangement is operably disposed within the thrust nozzle along the central axis thereof, the arrangement is rotatable 360° about the central axis. The jet propelled vehicle also includes an arrangement to effect relative rotation between the thrust nozzle and the jet deflecting arrangement for varying the volume flow of gases in a selectable segment of the throat area in the nozzle so that the jet deflecting arrangement is effective to change the direction of the jet stream emanating from the throat nozzle.

Another aspect of the invention resides in the provision of a jet propelled vehicle with a convergent-divergent thrust nozzle including a throat of restricted cross sectional area. A combination jet deflecting and throat area varying arrangement is disposed within the thrust nozzle and extends at least in part into the divergent section thereof. There is also provided means to effect relative rotation between the nozzle and the combination jet deflecting and throat area varying arrangement. The relative rotation takes place about the central axis of the nozzle and is effective to vary the direction of the jet stream emanating from the thrust nozzle. There is further provided means connected to the combination jet deflecting and throat area varying arrangement to axially displace it relative to the throat area of the nozzle for varying the volume flow of gases in a selectable segment of the throat area in the nozzle. And a further aspect of the invention relates to the aforesaid device but also includes infiltrants suitable for thermo degradably cooling the jet deflecting and/or throat area varying arrangement.

For a better understanding of the present invention, together with other and further objects thereof, reference is had to the following description taken in connection with the accompanying drawings, and its scope will be pointed out in the appended claims.

Figure 1:
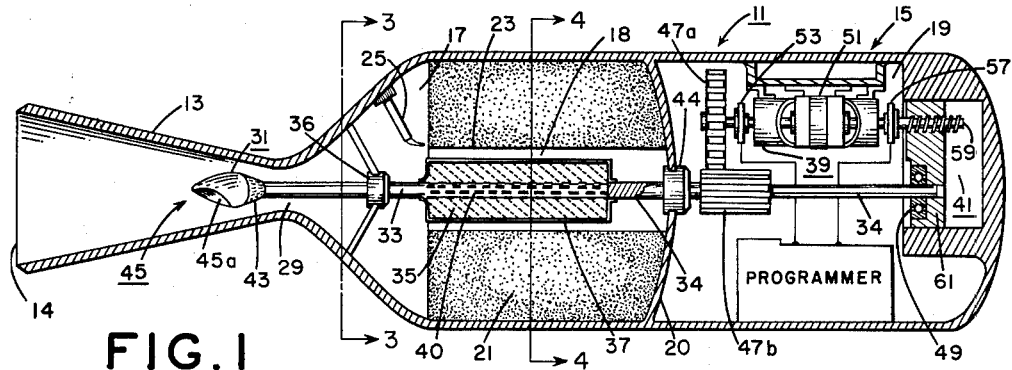
FIGURE 1 is a longitudinal sectional view through a missile embodying the principles of this invention.

Referring now to the drawing, there is shown a multiple section missile 11 comprising a convergent-divergent reaction thrust nozzle 13 having a neck of restricted cross-sectional area at the aft end of the missile, and a pressure vessel 15 is integral with and contiguous to the nozzle and constitutes the main shell of the missile. The pressure vessel is partitioned and includes a combustion chamber 17 at the aft end of the shell and a control mechanism compartment 19 at the forward end thereof.

More particularly, the vessel 15, as illustrated in the drawing, is an annulus having near the axial center thereof a transverse partition wall 20. While the vessel is shown as having an annular configuration there is no difficulty in adapting the invention in differently shaped missiles, such as pear or spherically shaped shells.

The combustion chamber 17 is lined (not shown) with a suitable insulation and an inhibitor. The inhibitor consists of a plastic material charged with an inert refractory filler. The chamber 17 serves as a storage compartment and contains a source of propellants 21 which are packed into the chamber by conventional means such as moulding, or pressing.

Figure 4:
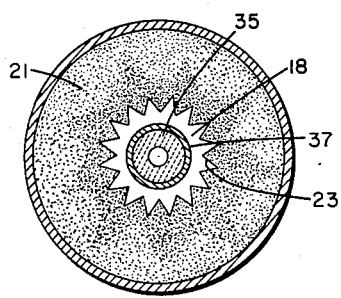
FIGURE 4 is a cross-sectional view taken along line 4—4 of FIGURE 1 illustrating a typical propellant grain design.

In FIGURE 4 there is shown a typical cross-section of the propellant grain 21 in which along the longitudinal axis thereof a star-like grain design provides a central passageway 18 extending through the combustion chamber 17. The core wall section 23 defining the passageway 18 is ignited, by a suitable igniting element 25, at the aft end adjacent to the nozzle to start combustion in the chamber 17. The burning or combustion starts from the core section and proceeds outwardly toward the radial periphery of the propellant and inwardly along its axis.

The combustion process develops gases which are channeled into and through a converging section 27 of the pressure vessel 15, passing the web structure 28, and proceeding into and through the convergent-divergent nozzle which is contiguous to the converging section 27 of the vessel.

Figure 2:
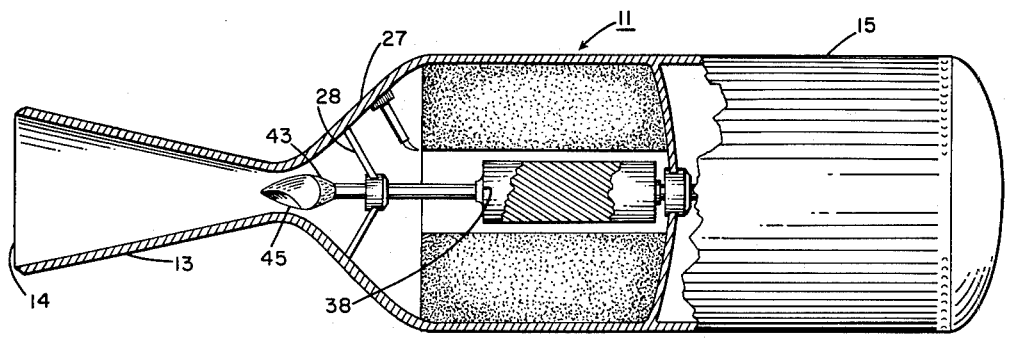
FIGURE 2 is a longitudinal view partly in section illustrating a modified version of the tubular storage vessel.
Figure 3:
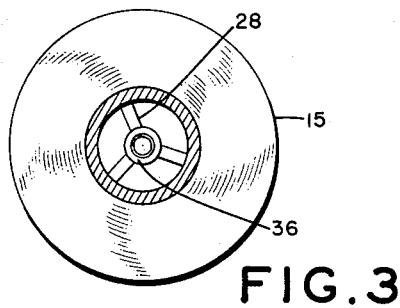
FIGURE 3 is a cross-sectional view taken along line 3—3 of FIGURE 1 showing the structural web adjacent to the discharge nozzle.

There is located in the nozzle, proximate to the neck or throat area 29, a jet deflecting and/or cancelling means such as a streamline shaped spike head 31 having a body of generally circular cross-section in which the diameter varies with respect to the longitudinal axis of the head. The spike head 31 is connected by tubing 33 to a source of supply of infiltrants 35 stored within container 37; the latter of which is disposed within passageway 18. The tubing 33, journalled in bushing 36, may extend through the container 37 and be provided with a plurality of openings 40 to enable fluid communication between the container 37 and the tubing, as shown in FIGURE 1, or connect to the container in which case the latter is provided with an aperture 38, see FIGURE 2, registering with the tubing 33 to permit fluid flow between the tubing and the container. In either situation a shaft 34 extends aft of the conainer 37 axially through the partition wall 20 and into the control mechanism compartment 19 wherein the tubing section 34 is connected to a rotating mechanism 39, effective to rotate the spike head, and an axial displacing mechanism 41 effective to axially displace the spike relative to the neck of the nozzle to vary the effective cross-sectional area thereof.

The shaft 34 is journalled in a bushing 44 mounted into partition wall 20, one end of the shaft is welded to the storage container 37. The container is preferably made of refractory material so as to be compatible with the extreme temperature prevailing in the combustion chamber. The infiltrants 35 have the primary function to provide thermo-degradation cooling for the spike head 31, the tubular extension 33 and the container 37.

The thermo-degradation cooling is effected by heat absorption in the infiltrants during heat up and phase change. It is preferable to select as infiltrant a material which is relatively stable and one that, in heating to 3,000° F., undergoes phase changes with sufficient absorption of thermo energy to make it useful. By selecting an infiltrant material which is thermo-degradable and which when exposed to heat will undergo a maximum number of state changes, heat is absorbed, thus taking advantage of heat of fusion and heat of dissociation or heat of vaporization. An example of such an infiltrant material with a high heat capacity per unit weight is lithium hydride which, in the process of changing from solid to liquid gas, requires a total of 5.35 kcal./gm. Many other suitable infiltrants exist, such as copper, aluminum, Teflon, and others.

As the infiltrants absorb the heat, pressure is generated and the infiltrants begin to expand through the tubular extension 33 and pass into a permeable section 43 adjacent to the tubular extension, the permeable section forming an integral part of the spike head. Transpiration of the infiltrants through the permeable section evolves a transpiration film which is effective to provide a protective, molecular wipe of vapor across the external surface of the spike head 31.

Proper infiltrants also may be utilized for a dual purpose, i.e., for cooling as above described as well as for the supplementary function of providing additional thrust or acting as a catalyst in the reaction nozzle.

Figure 5:
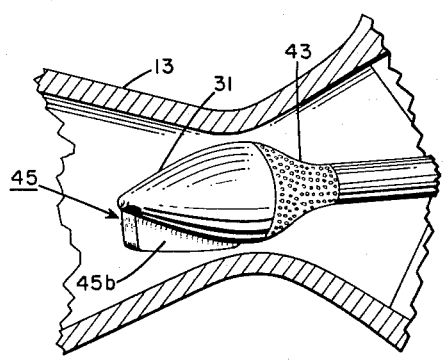
FIGURE 5 is a fragmentary enlarged view similar to FIGURE 1, illustrating a modified spike head.

All gases which ultimately escape through the nozzle 13 set up at the mouth 14 thereof a resultant vector. To offset or radially displace the resultant vector the circular cross-section of the generally streamlined spike head includes a portion that deviates from the general streamline pattern, more particularly, the head provides a non-circular disruption which may be in the form of a cavity 45a, see FIGURE 1, or a convex structure 45b, such as illustrated in FIGURE 5, which is either part of or connected to the spike head. Either arrangement is effective upon rotation of the spike head to change the direction of the jet stream emanating from the thrust nozzle.

Alternatively, or in combination with above detailed methods, the jet deflecting and/or cancelling means such as the spike head 31, may be constructed without a macroscopic non-circular disruption 45; the permeable section 43 can be substantially replaced by non-permeable material. The section 43 is provided with a circular sector of permeable material, not shown, which is in flow communication with infiltrants 35. The infiltrant gases are thus concentrated in one outlet area and the flow through the circular sector establishes a radial stream of a magnitude sufficient to radially deflect the thrust gases.

To obtain complete steering flexibility the spike head is rotatable 360°, this permits the non-circular disruption 45 to angularly deflect the gas stream thereby upsetting the "normal" laminar flow pattern and causing the normal resultant vector to be radially displaced.

The laminar fluid flow pattern and the resultant vector appertaining thereto may be considered "normal" if and when the spike head is sufficiently removed from the throat area 29 so as to be ineffective to vary the direction and/or thrust of the bypassing fluids within the nozzle. Thus by vectoring, i.e., bringing the spike head in closer proximity to the throat area, the non-circular disruption 45 changes the angularity of the thrust gas stream and, as a result thereof, the flight path of the missile.

By varying the effective throat area of the nozzle by means of displacing the spike head relative to the throat area, complete speed control may be accomplished. Thus by reducing the effective throat area the thrust is cancelled and a choking effect is obtained.

At times it may be desirable to rotate and/or axially displace the spike head. If the speed at which the missile is traveling is to be substantially reduced and the proximity of the non-circular disruption of the spike head to the throat area is likely to effect the flight path, and the latter action is not called for, rapid rotation of the spike head within the nozzle will negate this influence by effectively counter-balancing any upsetting force.

To those versed in the art it will be evident that there are numerous ways to effect the axial displacement and rotation of the spike head. Illustration of rotation mechanism 39 and axial displacement mechanism 41 serves primarily to facilitate a better understanding of the invention.

Briefly, the rotation mechanism includes a parallel shaft gear set 47a, 47b, one of which (47b) is mounted about shaft 34, and meshing gear 47a is rotated by a double shaft gear reduction motor unit 51. A magnetic clutch 53 is interposed between gear 47a and the motor unit 51.

The axial displacement mechanism 41 comprises motor unit 51, a magnetic clutch 57 is interposed between a threaded shaft portion 59 and the motor. The threaded shaft 59 extends through a longitudinally movable block 61 suitably mounted into the shell 15. The block is adapted to rotatably receive shaft 34, by means of a ball bearing 49 into which the shaft extends with a press fit.

A conventional electronic programmer, or guidance control unit, signals the operating requirements to the magnetic clutches 53, 57 to actuate the gear 47a, or shaft 59, or both, to axially displace or rotate the spike head within the discharge nozzle.

While there have been described what at present are considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

I claim as my invention:

1. In a jet propelled vehicle: a convergent-divergent thrust nozzle having a throat of restricted cross-sectional area; jet deflecting means operably disposed within said thrust nozzle along the central axis thereof and rotatable 360 degrees about said axis; and means to effect relative rotation between said nozzle and said jet deflecting means for varying the volume flow of gases in a selectable segment of the throat area in the nozzle, whereby said jet deflecting means becomes effective to change the direction of the jet stream emanating from the thrust nozzle.

2. A device according to claim 1, wherein said jet deflecting means is constituted by a generally streamlined body including a portion thereof deviating from the streamlined configuration.

3. A device according to claim 2, wherein said deviating portion is constituted by a cavity in said body.

4. A device according to claim 2, wherein said deviating portion is constituted by a convex structure in said body.

5. In a jet propelled vehicle: a convergent-divergent thrust nozzle having a throat of restricted cross-sectional area; a generally streamline shaped spike head disposed in and concentric with said nozzle; means to rotate said spike head; said head including a portion deviating from the streamline configuration and being constructed and arranged to effect a change in the direction of the jet stream emanating from the thrust nozzle upon rotation thereof; and means for axially displacing said spike head relative to said throat to vary the effective cross-sectional area thereof.

6. In a jet propelled vehicle: a combustion chamber; a convergent-divergent thrust nozzle contiguous thereto; a hollow elongated container within said chamber and substantially coextensive therewith; a generally streamline shaped spike head connected with said container and extending into said thrust nozzle, said head including a portion formed of permeable material; means for axially displacing said spike head relative to the throat of said nozzle to vary the effective cross-sectional area thereof; means to rotate said spike head; said head including a portion deviating from the streamline shaped configuration and constructed and arranged to effect a change in the direction of the jet stream emanating from the thrust nozzle upon the rotation of said head; and infiltrant materials stored within said container transpirable through said permeable portion and effective to thermo-degradably cool said spike.

7. In a jet propelled vehicle: a combustion chamber; a convergent-divergent thrust nozzle contiguous thereto; a hollow elongated container within said chamber and substantially coextensive therewith; a streamlined body disposed within said nozzle including an arcuate portion composed of permeable material; means for axially displacing said spike head relative to the throat of said nozzle to vary the effective cross-sectional area thereof; means to rotate said spike head; and infiltrant materials stored within said container transpirable through said permeable portion and effective to thermo-degradably cool said body and to effect a change in the direction of the jet stream emanating from said nozzle.

8. A vehicle according to claim 6, wherein said infiltrant material transpirable through said permeable section simultaneously constitute a propellant additive.

9. A vehicle according to claim 6, wherein said infiltrant material transpirable through said permeable section simultaneously constitutes a catalyst for promoting combustion of the exhaust gases.

10. A vehicle according to claim 2, and including a container structurally associated with said streamlined body; and infiltrants suitable for thermo-degradable cooling carried within said container, said infiltrants defining a solid physical structure at room temperature and being adapted and arranged to fuse and to vaporize in operative proximity to said streamlined body during the normal operation of the jet propelled vehicle.

11. In a jet propelled vehicle: a convergent-divergent thrust nozzle having a throat of restricted cross-sectional area; jet deflecting and throat area varying means disposed within said thrust nozzle and extending at least in part into the divergent section thereof; means to effect relative rotation between said nozzle and the first named means about the central axis of said nozzle to vary the direction of the jet stream emanating from the thrust nozzle; and means connecting to said first named means for axially displacing said first named means relative to said throat for varying the volume flow of gases in a selectable segment of the throat area in the nozzle.

12. A vehicle according to claim 11, and a container structurally associated with said jet deflecting and discharge area varying means; and infiltrants suitable for thermo-degradable cooling carried within said container, said infiltrants having a solid physical structure at room temperature and being adapted and arranged to fuse and to vaporize during the normal operaton of the jet propelled vehicle in operative proximity to said jet deflecting and discharge area varying means.

13. A vehicle according to claim 12 in which said jet deflecting and discharge area varying means includes a section constructed of permeable material and said infiltrants are transpirable therethrough.

14. In a jet propelled vehicle: a combustion chamber forming a body of circular cross-section; a convergent-divergent thrust nozzle connected thereto; a solid propellant fuel within said chamber having a grain structure providing a hollow passageway substantially along the axial center of said body; an elongated hollow container within said passageway; a generally streamline shaped spike head rigidly connected to portions of said container and extendable into said discharge nozzle, said spike head including a section adjacent to said nozzle formed of permeable material and a circumferential portion of said head deviating from the streamline shaped configuration; thermo-degradable cooling means stored within said container and transpirable through said permeable section of said spike head; rotating means connected to said vessel effective to rotate said spike head; axial displacement means connected to said vessel effective to axially move said spike head; and programming and guidance control means within said vehicle for automatically controlling the extent of axial displacement and degree of rotary motion of said spike head.

References Cited in the file of this patent
UNITED STATES PATENTS

| 2,354,151 | Skoglund | July 18, 1944 |
| 2,468,820 | Goddard | May 3, 1949 |
| 2,540,594 | Price | Feb. 6, 1951 |
| 2,570,629 | Anxionnaz et al. | Oct. 9, 1951 |
| 2,574,190 | New | Nov. 6, 1951 |
| 2,658,332 | Nicholson | Nov. 10, 1953 |
| 2,694,898 | Stauff | Nov. 23, 1954 |
| 2,702,986 | Kadosch et al. | Mar. 1, 1955 |
| 2,780,914 | Ring | Feb. 12, 1957 |
| 2,838,909 | Meulien | June 17, 1958 |
| 2,867,085 | Saboe | Jan. 6, 1959 |
| 2,870,603 | Long | Jan. 27, 1959 |
| 2,903,851 | Fiedler | Sept. 15, 1959 |
| 2,916,873 | Walker | Dec. 15, 1959 |
| 3,022,190 | Feldman | Feb. 20, 1962 |
| 3,026,806 | Runton et al. | Mar. 27, 1962 |
| 3,038,305 | Price | June 12, 1962 |
| 3,040,523 | Price | June 26, 1962 |
| 3,048,974 | Bertin et al. | Aug. 14, 1962 |

FOREIGN PATENTS

| 1,003,758 | France | Nov. 21, 1951 |
| 1,025,715 | France | Jan. 28, 1953 |
| 1,036,540 | France | Apr. 22, 1953 |
| 1,060,291 | France | Nov. 18, 1953 |
| 1,108,090 | France | Aug. 17, 1955 |